Dec. 15, 1925.                                                              1,565,450
H. H. HIPWELL
ELECTRIC BATTERY AND METHOD OF MAKING THE SAME
Filed Feb. 26, 1925
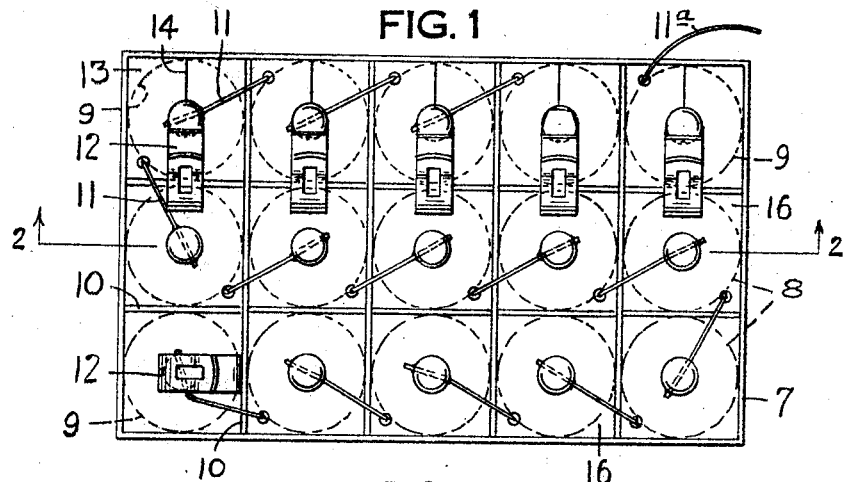
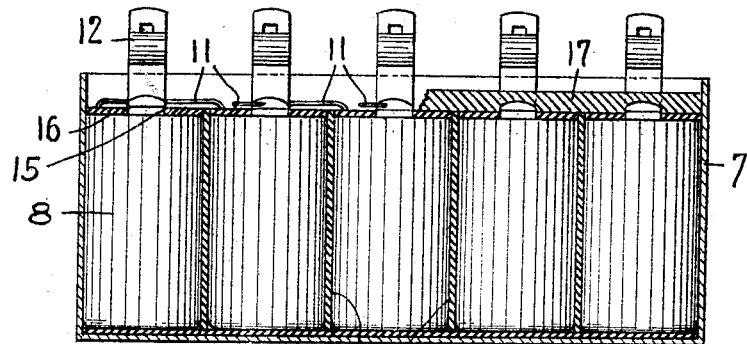
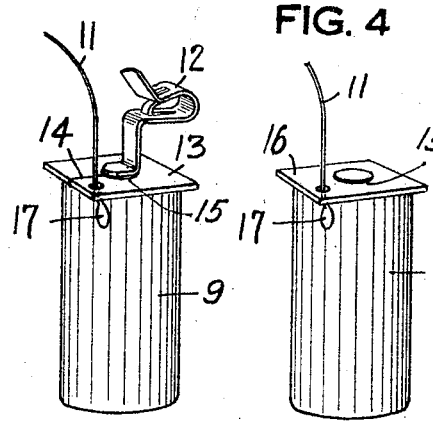
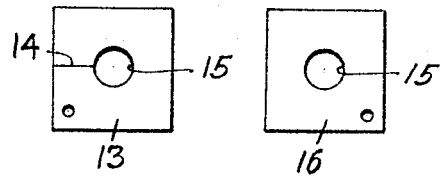
INVENTOR
Harry H. Hipwell
By Kay, Totten & Martin,
Attorneys Patented Dec. 15, 1925.

1,565,450

UNITED STATES PATENT OFFICE.

HARRY H. HIPWELL, OF PITTSBURGH, PENNSYLVANIA.

ELECTRIC BATTERY AND METHOD OF MAKING THE SAME.

Application filed February 26, 1925. Serial No. 11,765.

*To all whom it may concern:*

Be it known that I, HARRY H. HIPWELL, a citizen of the United States, and a resident of Pittsburgh, in the county of Allegheny and State of Pennsylvania, have invented a new and useful Improvement in Electric Batteries and Methods of Making the Same; and I do hereby declare the following to be a full, clear, and exact description thereof.

My invention relates to electric batteries and is particularly applicable to small batteries such as those employed in connection with radio installations.

Heretofore the "B" battery of radios, for instance, have in many cases been composed of cells, each of which is wrapped in waxed paper or the like and then assembled in a container with the other cells going to make up the battery. Sealing wax is then poured over the tops of the cells and flows down between them, forming the cells into a unitary structure. Since such cells commonly contain an electrolytic element in paste form which softens and gasifies under heat, the hot wax softens the paste and causes it to bubble out of the cells, through the formation of gas in the cells. The paste runs down the sides of the cells and often causes short circuits between walls of adjacent cells. Also, the physical structure within the cell is broken up and the efficiency of the cell thereby impaired.

My invention has for its object the provision of means for avoiding the various difficulties such as those above discussed, as well as the provision of various features which simplify and improve generally the construction of batteries.

One form which my invention may take is shown in the accompanying drawing, wherein Fig. 1 is a plan view of a battery embodying my invention; Fig. 2 is a view taken on the line 2—2 of Fig. 1; Fig. 3 is a detailed view of one of the cells; Fig. 4 is a similar view of another cell; Fig. 5 is a view of a cap or cover for the cell of Fig. 3, and Fig. 6 is a view of a cover of Fig. 4.

I provide a battery box 7 which may be of the usual form and is preferably of insulating material, for the reception of cells 8 and 9. The cells 9 are provided with terminal clips that may be of standard construction. Partitions 10 of fiber or like insulating material are provided for spacing the cells and holding them in their proper positions. Each cell is provided with a connecting wire 11 that extends from a pole of one cell to the opposite pole of an adjacent cell, so that the cells are connected in series. Terminal clips 12 are soldered to one pole of each of the cells 9, as shown more clearly in Fig. 3.

Fiber or like washers 13 are provided for covering the cells 9. These washers are preferably applied after the terminals 12 have been secured to the cells and are slitted, as indicated at 14, so as to permit of their being placed in position by passing the shank of the terminal through the slit 14. The aperture 15 in the washer fits snugly around the pole of the cell to which the clip 12 is secured.

Washers 16 are provided for the batteries 8. These washers need not be slit, because they are placed on the cells before the connecting wires 11 are fastened to the mid poles of the batteries.

Washers 13 and 16 fit snugly between the partitions 10 and serve not only to brace and support said partitions and the battery structure generally but serve also as cover members, to prevent flow of wax between the cells and to shield the spaces between the cells from falling drops of solder, pieces of wire, and other foreign matter.

Preliminary to assembling the battery, the connecting wires 11 are soldered to the wall of the cells 8 and 9 at 17. This wall serves as one pole of the battery. In the case of the cells 9, clips 12 are secured to the mid poles thereof before placing the covers 13. The cells may then be placed in position between the partitions 10. The covers 13 are then placed upon the cells 9, as above described, and the covers 16 placed upon the cells 8, as shown more clearly in Fig. 4. The covers 13 and 16 are then pressed snugly to their seats in the upper ends of the partitions. At this time one end of each of the wires 11 is free as indicated at 11ª in Fig. 1. These wires are then brought to horizontal position and soldered to the mid-poles of adjacent cells 8 and 9 as the case may be, as shown in Fig. 1. The covers 13 and 16 prevent solder from falling between the cells and short circuiting them. The ends of the wires 11ª are then cut, if necessary, to the proper length. Here again the covers prevent bits of wire from falling between the cells.

Hot sealing wax is thereafter poured upon the cells, preferably to the depth indicated at 17 in Fig. 2, a portion of the batteries being shown uncovered, for the purpose of more clearly showing the manner of construction. The covers 13 and 16 besides preventing the sealing wax from coming in contact with the wax usually present in the upper portion of each cell, also prevent it from falling down between the cells. There is not only a saving in wax, but heating of the cells is avoided and the contents thereof left undisturbed.

I claim as my invention:

1. The combination with a battery structure having a plurality of cells, of partitions dividing said cells and cover plates seated upon the cells and fitting between the said partitions, the said cover plates each being provided with openings for cell terminals.

2. The combination with a battery structure, of a plurality of compartments each adapted to contain a single cell, and a cover plate fitting between the walls of each compartment adjacent to the upper end thereof and seated upon the adjacent cell.

3. The combination with battery structure, of a plurality of cells, means for holding said cells in spaced relation, insulating cover material for the upper ends of said cells, a pair of terminals on each of said cells extending through openings in said cover material, and sealing wax covering said material and imbedding said terminals.

In testimony whereof I, the said HARRY H. HIPWELL, have hereunto set my hand.

HARRY H. HIPWELL.